(12) United States Patent
Bayramoglu

(10) Patent No.: US 7,720,170 B2
(45) Date of Patent: May 18, 2010

(54) LOW EMISSION SIGNAL GENERATOR AND DISTRIBUTOR SYSTEM

(75) Inventor: Gokalp Bayramoglu, Pleasanton, CA (US)

(73) Assignee: AWQ Consulting Inc., Pleasanton, CA (US)

( * ) Notice: Subject to any disclaimer, the term of this patent is extended or adjusted under 35 U.S.C. 154(b) by 172 days.

(21) Appl. No.: 11/592,873

(22) Filed: Nov. 6, 2006

(65) Prior Publication Data

US 2007/0133999 A1    Jun. 14, 2007

Related U.S. Application Data

(60) Provisional application No. 60/749,486, filed on Dec. 13, 2005.

(51) Int. Cl.
  *H04B 15/00* (2006.01)
(52) U.S. Cl. ........................ 375/285; 375/240; 375/239; 375/238; 375/295; 375/316; 375/340; 375/342
(58) Field of Classification Search ................. 375/285, 375/240, 239, 238, 295, 316, 340, 342
See application file for complete search history.

(56) References Cited

U.S. PATENT DOCUMENTS

| | | | | |
|---|---|---|---|---|
| 4,027,152 A * | 5/1977 | Brown et al. ................. | 398/190 |
| 4,340,864 A * | 7/1982 | Malinowski et al. ......... | 327/113 |
| 4,471,355 A * | 9/1984 | Hardy et al. ............ | 340/870.31 |
| 4,691,120 A * | 9/1987 | Kondo ......................... | 327/172 |
| 5,629,489 A * | 5/1997 | Hipkiss et al. .......... | 73/862.622 |
| 5,657,026 A * | 8/1997 | Culpepper et al. ........... | 342/374 |
| 5,929,489 A * | 7/1999 | Deane ......................... | 257/347 |
| 6,049,888 A * | 4/2000 | Chanoux ......................... | 714/4 |
| 6,262,600 B1 * | 7/2001 | Haigh et al. ................... | 326/82 |
| 6,538,481 B1 * | 3/2003 | Suetsugu ..................... | 327/109 |
| 6,728,306 B1 * | 4/2004 | Shi ............................. | 375/149 |
| 7,274,225 B2 * | 9/2007 | Feldtkeller ................... | 327/112 |
| 7,304,513 B2 * | 12/2007 | Chatterjee et al. ........... | 327/115 |
| 2001/0010712 A1 * | 8/2001 | Hedberg ..................... | 375/296 |
| 2003/0130017 A1 * | 7/2003 | Shiotsu et al. .............. | 455/575 |
| 2003/0227944 A1 * | 12/2003 | Nierzwick et al. .......... | 370/503 |
| 2004/0102164 A1 * | 5/2004 | Taghizadeh-Kaschani .. | 455/130 |
| 2004/0266367 A1 * | 12/2004 | Tuominen et al. ............. | 455/91 |
| 2005/0070229 A1 * | 3/2005 | Casper et al. ............ | 455/67.14 |
| 2005/0119025 A1 * | 6/2005 | Mohindra et al. ........ | 455/552.1 |
| 2005/0218902 A1 * | 10/2005 | Restaino et al. ............. | 324/433 |
| 2008/0211594 A1 * | 9/2008 | Pedersen et al. ............ | 332/109 |

* cited by examiner

*Primary Examiner*—Chieh M Fan
*Assistant Examiner*—Siu M Lee

(57) ABSTRACT

A low emission signal manipulating circuit for reducing emission of a given signal. This is accomplished by manupulating the signal and recovering the original signal. The inventive device includes a transmitter which modifies a given signal, a divider that resides in transmitter which divides the incoming signal, a pulse shaping circuit which generates two pulses one at the leading edge and one at the trailing edge of the incoming signal, a receiver which recovers the original signal from the modified signal, a register which generates a signal based on incoming pulses, a phase locked loop circuit that generates a signal at the output. Transmitter has a divider circuit that divides the incoming signal. It also has pulse circuits where two pulses are generated. Divider has five flip flops that divides the incoming signal's frequency by a predetermined amount. Pulse shaping circuit has two integrators and logic gates. Receiver has a register circuit and phase locked loop. Register has a flip flop. Phase Locked Loop has a phase comparator, charge pump, voltage controlled oscillator and a divider.

9 Claims, 5 Drawing Sheets

LOW EMISSION SIGNAL GENERATOR AND DISTRIBUTOR SYSTEM

This application claims the benefit of U.S. Provisional Application No. 60/749,486 filed Dec. 13, 2005. The present invention relates generally to clock generator and more specifically it relates to a low emission signal generator and distribution system for reducing emission of a given signal. This is accomplished by modifying the original signal and recovering the original signal from the modified signal.

BACKGROUND OF THE INVENTION

1. Field of the Invention
2. Description of the Related Art

Clock generators have been in use for years. Typically, clock generators are comprised of chips from semiconductor companies that utilize Spread Spectrum technology. This technique is used to reduce the electromagnetic interference (EMI).

Main problem with conventional clock generators is that the high frequency of the clock signal causes increased EMI. When the spread spectrum technique is used to reduce the EMI, jitter is introduced in the clock signal which may impact the circuit operation. Another problem with conventional clock generators that use the spread spectrum technique is that the emission reduction can only reach to about −10 dB. Another problem with conventional clock generators that use the spread spectrum technique is that the circuit complexity is increased when compared with clock generators that do not employ the spread spectrum technique.

While these devices may be suitable for the particular purpose to which they address, they are not as suitable for reducing emission of any given signal. This is accomplished by manipulating the signal and recovering the original signal.

U.S. Pat. No. 6,292,507 B1 discloses a spread spectrum clock generator circuit which automatically compensates for the variation in passive component values and system gain and charge pump current in the phase locked loop. This clock generator is a single chip generator. Modified clock has jitter and the reduction in EMI is limited.

U.S. Pat. No. 6,647,052 discloses generation of a spread spectrum master clock and plurality of phase-offset spread spectrum slave clocks. Different phase offsets are generated using phase delays. These phase delays are either predetermined or calculated dynamically. This clock generator provides limited EMI reduction.

U.S. Pat. No. 6,975,148 discloses a spread spectrum clock generator. The design uses current control oscillator. The clock generator has limited EMI reduction. It introduces jitter in the modified clock signal.

U.S. Pat. No. 7,095,260 B2 discloses a spread spectrum clock generator that uses single chip to generate a spread spectrum clock.

These patents mentioned above each uses single chip to generate spread spectrum clock which has jitter.

In these respects, the low emission signal manipulating circuit according to the present invention substantially departs from the conventional concepts and designs of the prior art, and in so doing provides an apparatus primarily developed for the purpose of reducing emission of a given signal by using a transmitter and multiple receivers. Transmitter modifies the signal to lower the electromagnetic emission and receivers recover the original signal.

SUMMARY OF THE INVENTION

In view of the foregoing disadvantages inherent in the known types of clock generator now present in the prior art, the present invention provides a new low emission signal manipulating circuit construction wherein the same can be utilized for reducing emission of any given signal. This is accomplished by modifying the original signal and recovering the original signal from the modified signal.

The general purpose of the present invention, which will be described subsequently in greater detail, is to provide a new low emission signal manipulating circuit that has many of the advantages of the clock generator mentioned heretofore and many novel features that result in a new low emission signal manipulating circuit which is not anticipated, rendered obvious, suggested, or even implied by any of the prior art clock generator, either alone or in any combination thereof.

To attain this, the present invention generally comprises a transmitter which modifies a given signal, a divider that resides in transmitter which divides the incoming signal, a pulse shaping circuit which generates two pulses one at the leading edge and one at the trailing edge of the incoming signal, a receiver which recovers the original signal from the modified signal, a register which generates a signal based on incoming pulses, a phase locked loop circuit that generates a signal at the output. Transmitter has a divider circuit that divides the incoming signal. It also has pulse shaping circuits where pulses are generated. Divider has flip flops that divides the incoming signal's frequency by a predetermined amount. Pulse shaping circuit has integrators and logic gates. Receiver has a register circuit and phase locked loop. Register has a flip flop. Phase Locked Loop has a phase comparator, charge pump, voltage controlled oscillator and a divider.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a low emission signal manipulating circuit that will overcome the shortcomings of the prior art devices.

Another object of the present invention is to provide a low emission signal manipulating circuit for reducing emission of a given signal. This is accomplished by modifying the signal and recovering the original signal from the modified signal.

Another object is to provide a low emission signal manipulating circuit that can lower the emission by up to −30 dB.

Another object is to provide a low emission signal manipulating circuit that reduces the emission without introducing any jitter. Current technology cannot accomplish emission reduction without introducing jitter into signal.

Another object is to provide a low emission signal manipulating circuit that is very simple to design and build yet provides great emission reduction with very low jitter.

Other objects and advantages of the present invention will become obvious to the reader and it is intended that these objects and advantages are within the scope of the present invention.

To accomplish of the above and related objects, this invention may be embodied in the form illustrated in the accompanying drawings, attention being called to the fact, however, that the drawings are illustrative only, and that changes may be made in the specific construction illustrated.

BRIEF DESCRIPTION OF DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
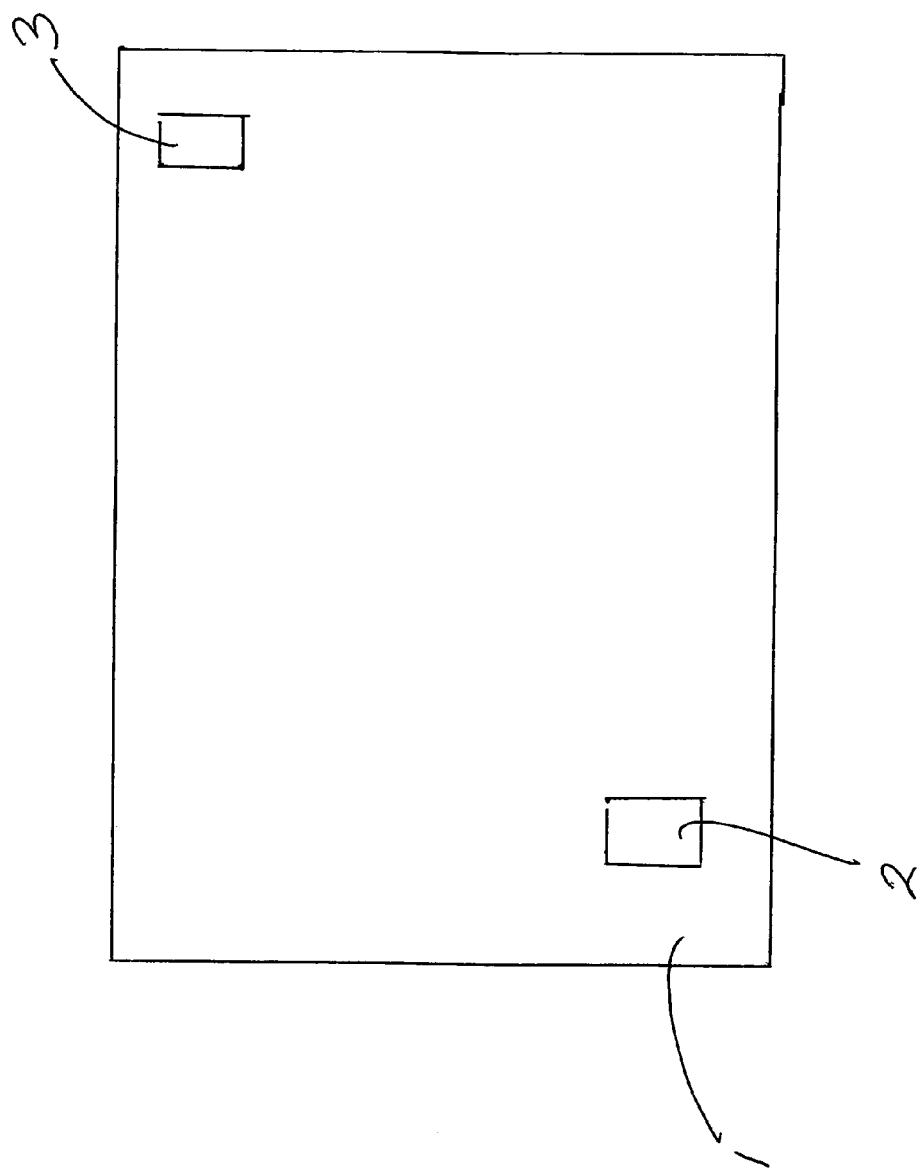
FIG. 1 is transmitter and receiver block diagrams.

Turning now descriptively to the drawings, in which similar reference characters denote similar elements throughout the several views, the attached figures illustrate a low emission signal manipulating circuit, which comprises a transmitter which modifies a given signal, a divider that resides in transmitter which divides the incoming signal, a pulse shaping circuit which generates pulses one at the leading edge and one at the trailing edge of the incoming signal, a receiver which recovers the original signal from the modified signal, a register which generates a signal based on incoming pulses, a phase locked loop circuit that generates a signal at the output. Transmitter has a divider circuit that divides the incoming signal. It also has a pulse shaping circuit where pulses are generated. Divider has flip flops that divides the incoming signal's frequency by a predetermined amount. Pulse shaping circuit has integrators and logic gates. Receiver has a register circuit and phase locked loop. Register has a flip flop. Phase Locked Loop has a phase comparator, charge pump, voltage controlled oscillator and a divider.

Transmitter has a divider circuit that divides the incoming signal. It also has pulse shaping circuit where two pulses are generated. Transmitter 2 accepts the signal 4 at its input and divides the signal by a predetermined number. This division is performed by the division unit 5 and the signal frequency is reduced. After the division, the resulting signal 6 is applied to the Pulse Shaping Unit 27. The pulse shaping circuit 27 has two integrators 7 and 21 and logic gates 9, 22, 23. This circuit generates pulses 10. A pulse is generated at the leading edge of the divided signal. Another pulse is generated at the trailing edge of the divided signal. Transmitter 2 can be a separate circuit by itself. It can also be incorporated in a bigger chip such as clock generator, clock distributor or microprocessor. It can also be incorporated in bridge and supporting chips of a microprocessor system. The divider 5 can be either fixed or programmable. When it is programmable, the division number is input to the circuit from the external circuit. The integrator circuits 7 and 21 can be built either using simple resistor-capacitor network or using operational amplifiers, or can also be built using digital signal processing techniques. Integrator circuits 7 and 21 can be replaced with any other circuit to generate pulses at the leading and trailing edges of the divided signal. This pulse generating circuit can also be programmed if necessary to adjust the pulse width of the resultant signal. The transmitter circuit 2 can work with different voltage levels including but not limited to 5V, 3.3V, 2.5V and 1.8V. Transmitter output 10 can be enabled or disabled to generate pulses. If the transmitter 2 is enabled, the output signal 10 will be narrow pulses at leading and trailing edges of the divided input signal. If the transmitter 2 is disabled, then the output 10 will be the same as the input signal 4. Transmitter 2 can also be implemented in software or firmware. If the incoming signal 4 is digitized, then this signal can be divided in software using digital processing techniques. This same software or firmware can also generate pulses 25, 26 and 10 that correspond to leading and trailing edges of the divided signal. Furthermore, software or firmware can manipulate the incoming signal 4 to generate a signal at the output that it's spectrum close to the spectrum of the output signal 10. The transmitter circuit 2 when implemented in hardware can either be a chip by itself, a part of a bigger chip or can be built as a discrete circuit using discrete analog and digital components.

Divider 5 has flip flops that divides the incoming signal's frequency by a predetermined amount. Divider 5 accepts the incoming signal 4 as its input and divides the frequency of this signal by a predetermined number. This number can either be fixed or can be programmed by the user and designer. Divider 5 can be built as a part of the transmitter chip 2 or as a part of a discrete hardware circuit. Divider 5 can also be implemented in a software or firmware program as a digital signal processing block. The divisor can be fixed or programmable. When implemented in hardware, it can be either analog or digital circuit.

Pulse shaping circuit has two integrators and logic gates. Pulse shaping circuit 27 accepts the divided signal as its input 6 and generates the signal 10 that correspond to leading and trailing edges of the divided input signal. By generating the signal 10, the pulse width of the original signal is reduced therefore the amplitude of the signal in frequency domain is reduced. In fact, this spreads the energy to other frequencies. The circuit contains two integrators 7 and 21 that consist of two resistors and two capacitors. When the input signal 6 is applied to first integrator the capacitor charges to incoming signal through input resistor. The charge time of the capacitor is determined by the resistor and capacitor values. This charge time in turn determines the pulse width of the resultant signal. The output of integrators 7 and 21 are connected to exclusive OR gates. The exclusive OR (XOR) gate accepts two inputs 6, 8, 24. One is the original divided signal 6 and the other is the output of the integrator 25. The output 29 of the XOR gate 27 is a pulse which the duration is determined by the integrator's time constant. Pulse shaping circuit 27 can be built in hardware or software or firmware. When implemented in software or firmware, digital signal processing techniques can be utilized to obtain pulses. When implemented in hardware, integrators 7 and 21 can be built using analog or digital components. The pulse duration of the output signal 10 can either be fixed or programmable. The generator circuit can either use digital or analog components. This design used XOR gates however any other gate or analog circuit can be used for implementing. The generator function can also be implemented in software or firmware.

Receiver has a register circuit and phase locked loop. Receiver 3 accepts the input signal 10 and generates the signal 18 from it. Signal 18 is the same signal as the signal 4 applied to the transmitter circuit 2. The goal is to convert the original signal 4 to pulses 10 so that the magnitude in frequency domain will be lowered. Receiver circuit 3 accepts pulses 10 generated by transmitter 2 and recovers the original signal 18 from input pulses 10. Receiver circuit 3 consists of register 11 and phase locked loop circuit 28. Register 11 generates divided signal 12 from incoming pulses 10. This signal 12 is applied to phase locked loop (PLL) circuit 28 to generate the signal 18. Phase locked loop 28 can either be fixed or programmable. Receiver 3 can be built in a chip itself or can be part of a bigger chip such as microprocessor, microprocessor support chip, bridge chip or any other application specific integrated circuit (ASIC). This way each ASIC can decode the incoming pulses and generate original signal from these pulses. Receiver circuit 3 can be implemented in hardware, software or firmware. If implemented in software or firmware, digital signal processing techniques can be utilized. When implemented in hardware, it can be analog, digital or mixed circuit. It can be designed in a chip or can be a discrete circuit. It can be programmable or fixed.

Register has a flip flop. Register 11 accepts input pulses 10 and generates a signal 12 from these pulses. The main function of the register 11 is to stretch the incoming pulses 10. A flip flop is used in this design. Incoming pulses 10 are applied to the clock signal of the flip flop. Therefore, the output of the flip flop is changed with each pulse. Register 11 can be built using digital circuit components such as flip flops and logic gates. It can also use analog circuit components. The function of the register 11 can be implemented by software or firmware. When implemented in software or firmware, digital signal processing techniques are used. Register 11 can also be implemented in a bigger circuit such as microprocessor or application specific integrated circuits.

Phase Locked Loop has a phase comparator, charge pump, voltage controlled oscillator and a divider. Phase locked loop 28 accepts the output 12 of the register 11 and generates the signal 18 which frequency is the multiple frequency of input signal 12. It consists of phase comparator 13, charge pump 15, voltage controlled oscillator 17 and the divider 20. Phase comparator 13 detects the phase differences between the input signal 12 and the feedback signal 19. It has two output pulses. One is called UP and the other DOWN. If input signal's 12 phase is greater than the feedback signal's 19 phase then the UP output will be high. Otherwise the down output will be high. These outputs are applied to charge pump 15 where charge currents 16 are generated. These charge currents 16 used to charge filter capacitor at the output. The capacitor output 16 is connected to voltage controlled oscillator (VCO) 17. VCO 17 accepts input voltage 16 and the frequency of the output 18 is determined by this input voltage. The output 18 of the VCO 17 is applied to the divider 20. The divider circuit 20 accepts the input 18 from the VCO 17 and divides the frequency of this signal 18 by a predetermined number. The output 19 of the divider is applied to the phase comparator 13 as the feedback signal 19. Therefore, this PLL circuit 28 multiplies the incoming signal 12 frequency by a predetermined number. Phase locked loop 28 can be built in the receiver chip 3 or can be built in application specific integrated chips. It can be built as analog, digital or combination of both. It can also be implemented in software or firmware. The division factor can be either fixed or programmable.

Transmitter unit 2 input 4 is the signal that is processed. Inside the transmitter unit 2, the input signal 4 is applied to the divider 5 which divides the frequency of the incoming signal 4 by a predetermined value. The output 6 of the divider 5 is applied to the Pulse Shaping Circuit 27. The Pulse Shaping Circuit 27 generates narrow pulses 10 one at leading edge and the other at trailing edge of the incoming signal. The output 10 of the Pulse Shaping Circuit 27 is tied to output pad of the transmitter 2. This signal 10 travels in the media and reaches to the receiver circuit 3. Receiver 3 accepts this signal 10 as the input signal and applies it to register circuit 11. The output 12 of the register circuit 11 is connected to the input 12 of the Phase Locked Loop. The output 18 of the Phase Locked Loop is the same as the input signal 4 to the transmitter circuit 2. The transmitter can be a stand alone circuit. It can also be incorporated inside of a larger ASIC. Receiver can also be a stand alone circuit. It can also be incorporated in a larger application specific integrated circuit. If these circuits are incorporated in application specific integrated circuits, then the original signal is applied to the application specific integrated circuit where the transmitter circuit resides. The output of the application specific circuit that holds the transmitter in it, is applied to the application specific circuit that holds the receiver in it. The output of the application specific circuit where the receiver circuit resides is the original signal. Phase Locked Loop circuit can be changed with a different circuit to generate same or similar results that is an output signal where the frequency is the multiple of the input signal frequency. Register circuit can be designed using different approaches such as digital, analog or combination of both.

Figure 2:
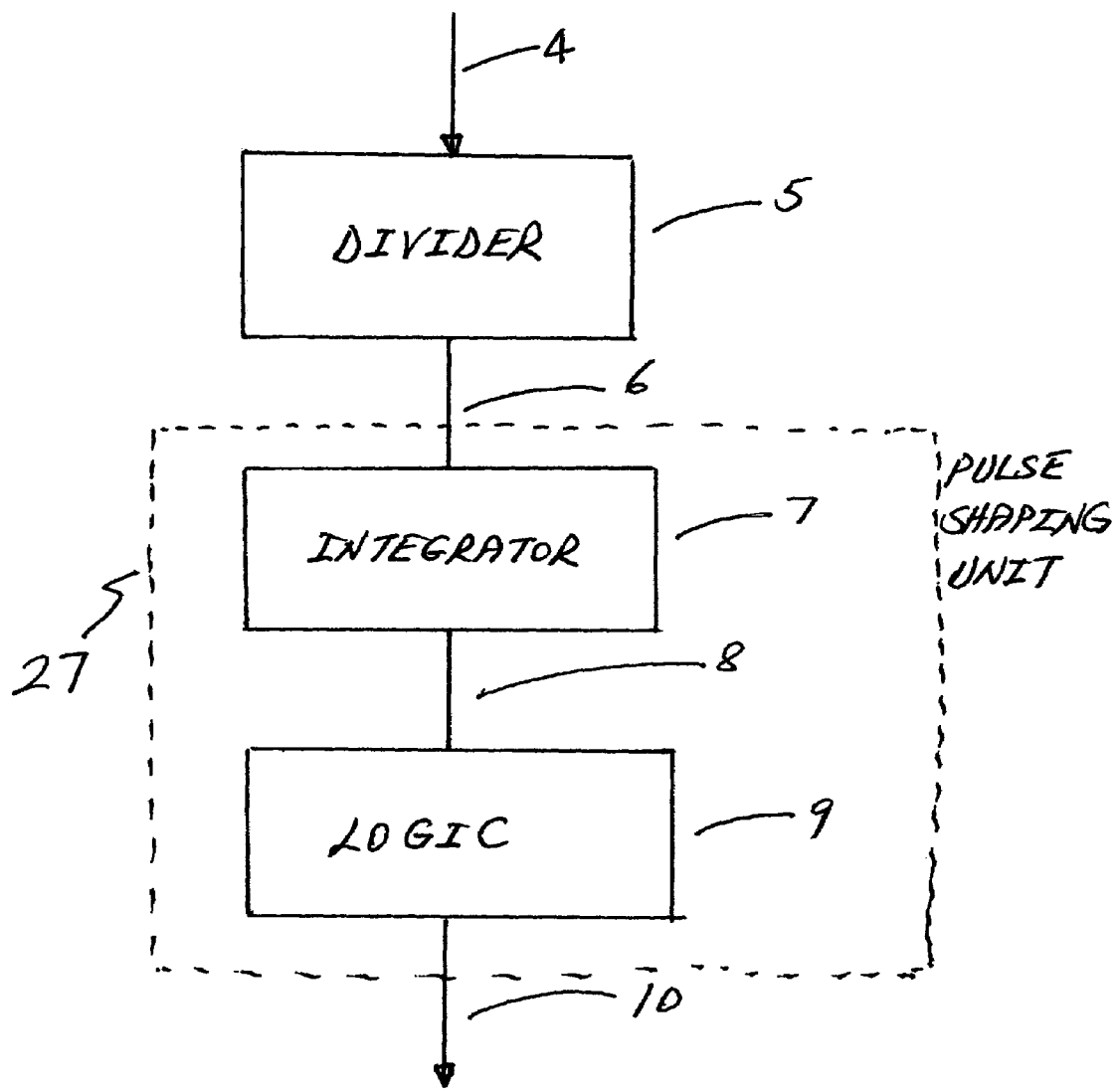
FIG. 2 is transmitter architecture.
Figure 3:
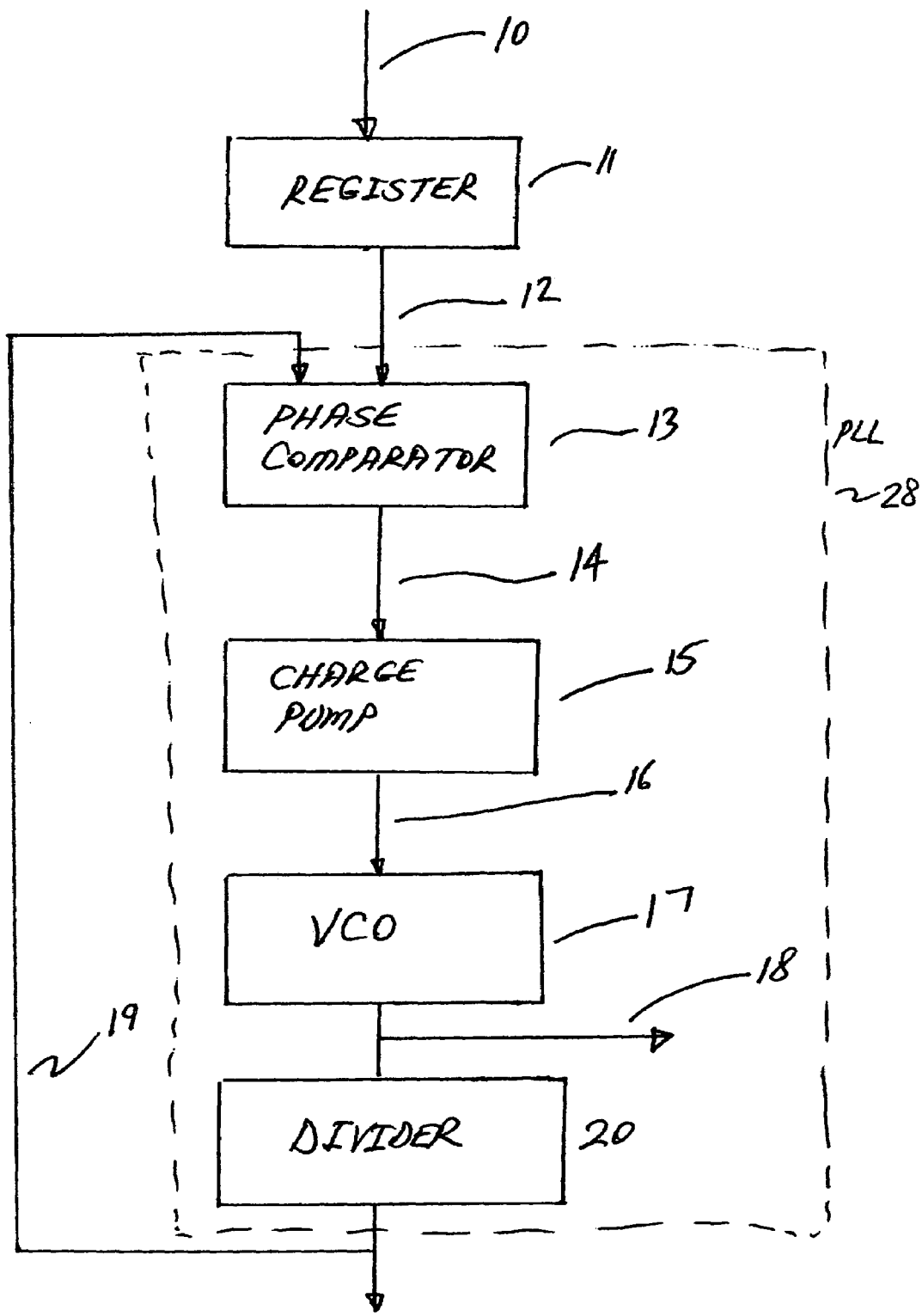
FIG. 3 is receiver architecture.
Figure 4:
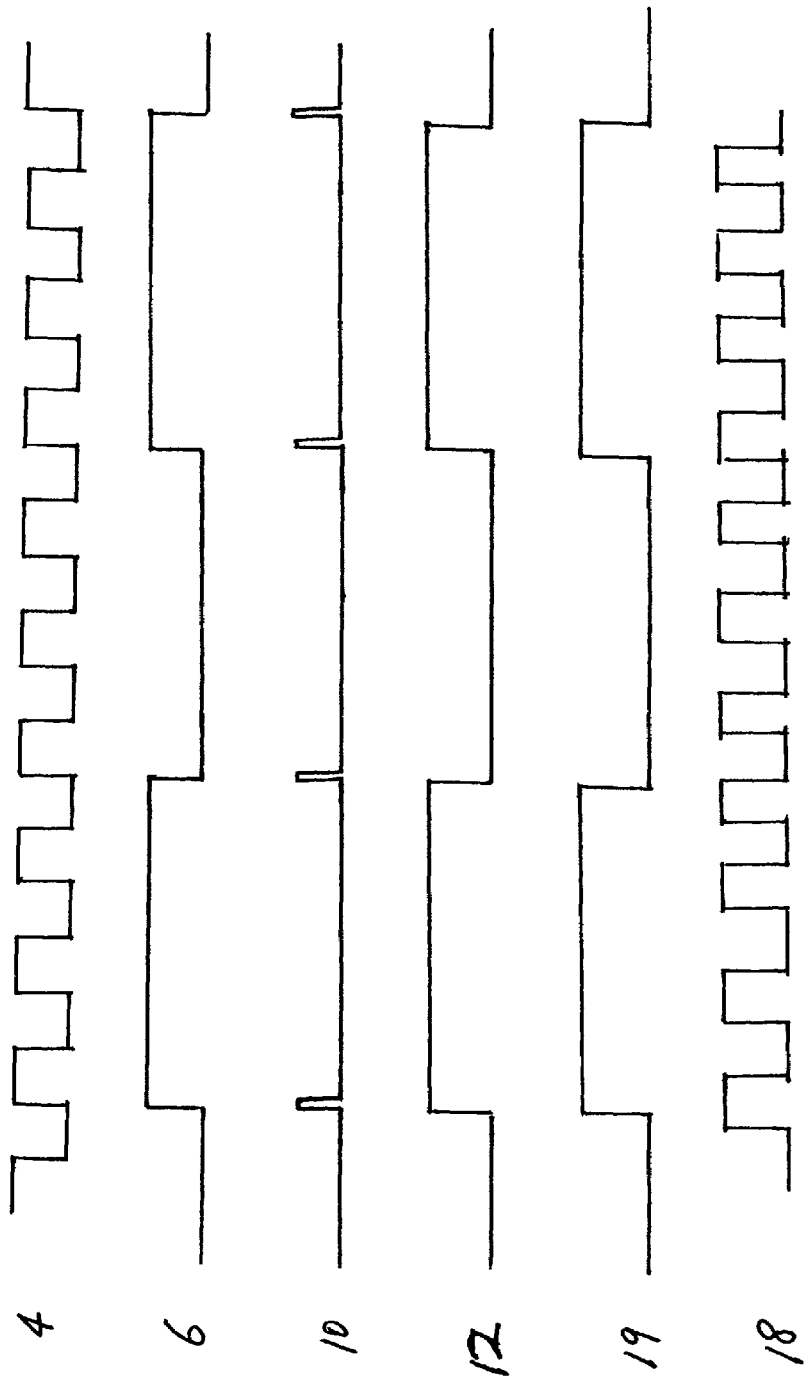
FIG. 4 is Pulse Diagrams
Figure 5:
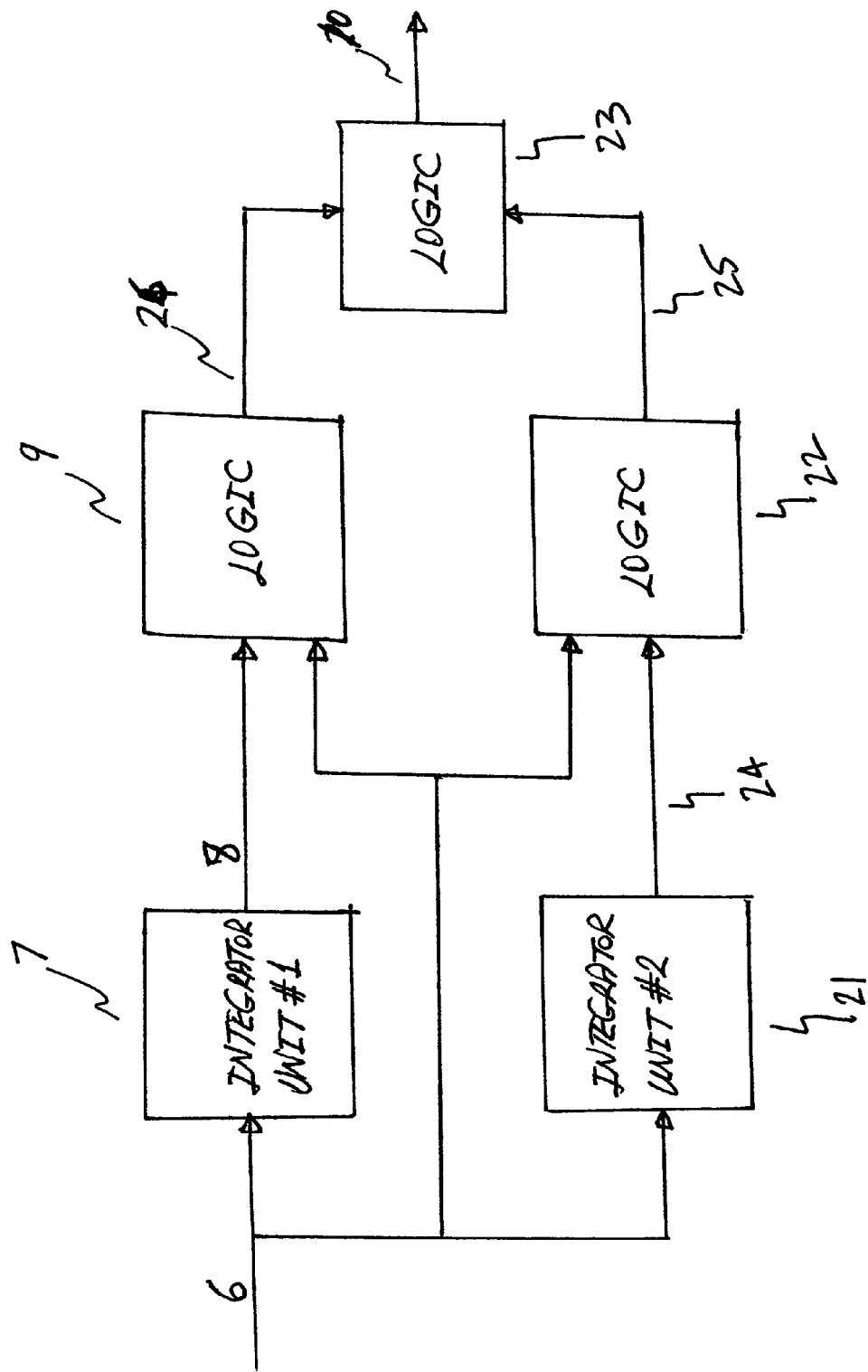
FIG. 5 is Pulse Shaping Unit

This invention modifies the frequency spectrum of any given signal such that the magnitude of the spectrum is reduced and energy is spread to different frequencies. The circuit is composed of the transmitter 2 and the receiver 3. FIG. 1 shows these components. The board 1 has the transmitter unit 2 and the receiver unit 3 among other circuitry. The board 1 has many other circuitry on it and all these circuits use a common clock for synchronous operation. The high frequency of the clock signal causes high magnitude signals in the frequency domain. These could occur at fundamental frequency as well as in harmonic frequencies. To eliminate these noises, the transmitter circuit 2 is added to the board. This way the clock signal is modified such that its frequency spectrum changes to reduce the noise. This signal with reduced noise is transmitted to other circuits on the board. On the other side of the circuit board 1, the receiver 3 is utilized to recover the original clock signal from the transmitted signal. There may be plural receivers on the board. Details of the transmitter circuit 2 are shown in FIG. 2. The clock signal 4 is applied to the divider circuit 5. The frequency of the input signal 4 is divided by the divider circuit 5. The output 6 of the divider circuit 5 is applied to the pulse shaping unit 27. The Pulse Shaping Unit is shown in FIG. 2 and FIG. 5. Referring to FIG. 5, the input 6 is applied to the Integrator Unit 7 and the Integrator Unit 21. These units integrate the incoming signals. The outputs 8 and 24 are applied to Logic circuits 9 and 22 along with the input signal 6. The outputs 26 and 25 from logic circuits 9 and 22 are applied to another logic circuit 23. The output 10 from the logic circuit 23 is the output of the transmitter unit. FIG. 3 shows the receiver circuit details. The input signal 10 is the modified clock signal that is sent by the transmitter unit 2. The signal 10 is applied to the register 11 which converts the incoming pulses to pulses with lower frequencies. The output 12 of the register circuit 11 is applied to the PLL 28. The details of the PLL 28 are shown in FIG. 3. The first element of the PLL is the Phase Comparator 13 which accepts input 12 from the Register 11 and the other input 19 from the Divider 20. After comparing the phases between the two input signals 12 and 19, the output 14 of the Phase Comparator is applied to the Charge Pump circuit 15. This circuit generates the current 16 required for the VCO (Voltage Controlled Oscillator) 17. The output 18 of the VCO 17 is the output of the PLL 28. This output 18 is also applied to the Divider 20 which divides the frequency of the signal 18. The output 19 of the divider 20 is applied to the Phase Comparator 13 as the other input as discussed above. The output 18 of the Receiver 3 is the original clock signal. FIG. 4 shows different signals at different stages of the system. Signal 4 is the original clock signal that is applied to the Transmitter 2. This signal is divided by the Divider 5 to obtain the signal 6. The Pulse Shaping Unit 27 accepts signal 6 at the input and generates the signal 10 which has lower magnitudes in frequency spectrum. The signal 10 is applied to the input of the Receiver 3. The Register 11 in the Receiver 3 converts the signal 10 to a signal with lower frequency which is signal 12. The output of the PLL 28 is the signal 18 which is the same as the original clock signal 4.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An integrated circuit system for reducing an electromagnetic radiation from a circuit board comprising:
    a transmitter for accepting an input signal and converting said input signal to an output signal that has a lower electromagnetic emission than said input signal, said transmitter comprises:
        a frequency divider for dividing said input signal by a number therefore generating an intermediate signal with lower frequency;
            wherein said number can be fixed or programmable;
            wherein said intermediate signal has pulses and each pulse has a leading edge and a trailing edge;
        a pulse shaper for generating the output signal having a first pulse at said leading edge of said intermediate signal and a second pulse at said trailing edge of said intermediate signal, said pulse shaper comprises:
            a first integrator for integrating the intermediate signal and output a first integrated signal;
            a first logic accepts the first integrated signal and the intermediate signal to generate a first logic signal;
            a second integrator for integrating the intermediate signal and output a second integrated signal;
            a second logic accepts the second integrated signal and the intermediate signal to generate a second logic signal;
            a third logic accepts the first and second logic signal to generate the output signal;
                wherein said first pulse has a first pulse duration and said second pulse has a second pulse duration;
                wherein said integrators are programmable to adjust said first pulse duration and said second pulse duration;
                wherein said integrators generate said output signal that has plurality of said first and said second pulses therefore spreading the energy in said output signal to reduce said electromagnetic emission;
    a receiver for receiving said output signal from said transmitter and generating a signal from said output signal which has substantially same frequency as said input signal.

2. A system in accordance with claim 1, wherein said transmitter is implemented as a standalone integrated circuit.

3. A system in accordance with claim 1, wherein said transmitter is implemented in a larger integrated circuit.

4. A system in accordance with claim 1, wherein said frequency divider is programmable for changing said number for changing said intermediate signal frequency.

5. A system in accordance with claim 1, wherein said receiver further comprises:
    a register circuit for increasing the duration of said output signal; and
    a phase locked loop to generate a signal which has substantially same frequency and pulse width as said input signal.

6. A system in accordance with claim 1, wherein said receiver is implemented as a standalone integrated circuit.

7. A system in accordance with claim 1, wherein said receiver is implemented in a larger integrated circuit.

8. An integrated circuit system comprising:
    a transmitter receiving an input signal having input energy and input frequency, the transmitter comprises:
        means for reducing the frequency of said input signal and generate an intermediate signal;
            wherein said input signal has plurality of input pulses;
            wherein each said input pulse has an input pulse duration;
        pulse shaping means for generating an output signal from said intermediate signal; wherein said pulse shaping means comprises:
            a first integrator for integrating the intermediate signal and output a first integrated signal;
            a first logic accepts the first integrated signal and the intermediate signal to generate a first logic signal;
            a second integrator for integrating the intermediate signal and output a second integrated signal;
            a second logic accepts the second integrated signal and the intermediate signal to generate a second logic signal;
            a third logic accepts the first and second logic signals to generate the output signal having a first pulse at each leading edges of said intermediate signal a second pulse at each trailing edges of said intermediate signal;
        wherein said output signal has an output energy;
        wherein said output signal has an output frequency;
        wherein said output signal has plurality of output pulses;
        wherein each said output pulse has a programmable output pulse duration;
        wherein said output pulse duration is shorter than said input pulse duration therefore spreading energy of said input signal and generate said output signal that has lower electromagnetic radiation;

a receiver receives said output signal of said transmitter after traveling on a circuit board; said receiver comprises:
  means for increasing said output pulse duration of said output signal;
  means for multiplying said output frequency of said output signal with said number used in said transmitter;
  means for generating a signal with plurality of pulses and a frequency;
  wherein each of said pulses has a pulse duration;
  wherein said pulse duration is substantially equal to said input pulse duration;
  wherein said frequency is substantially equal to said input frequency.

9. A system in accordance with claim 8, wherein said receiver comprises a PLL circuit for generating said input signal from the said output signal.

* * * * *